Dec. 25, 1951     J. A. GIALANELLA     2,579,815
EXTRUSION APPARATUS
Filed Nov. 27, 1948
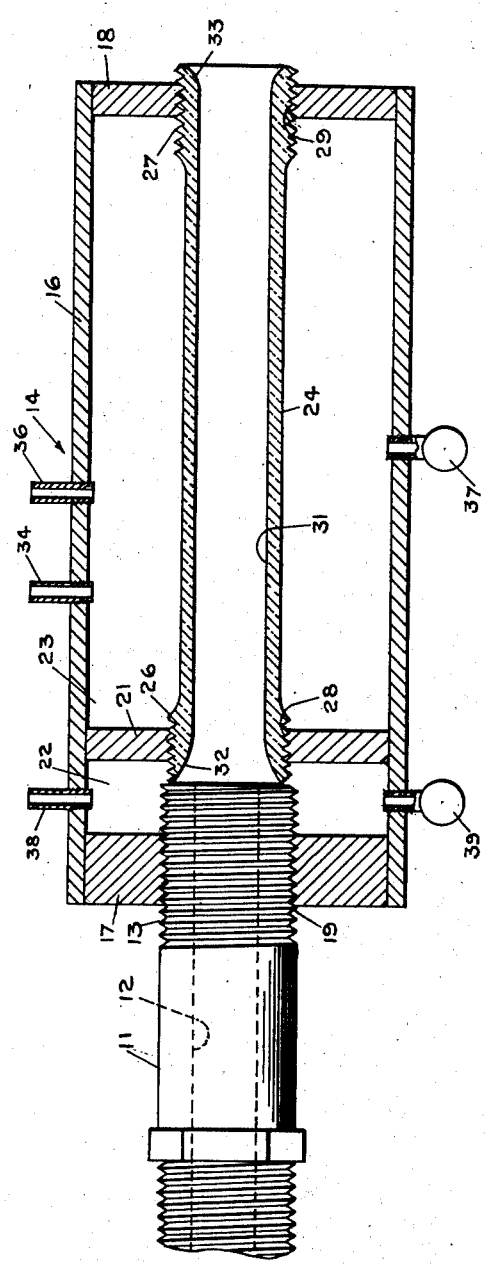
INVENTOR.
JOSEPH A. GIALANELLA
BY
ATTORNEYS Patented Dec. 25, 1951

2,579,815

UNITED STATES PATENT OFFICE 2,579,815

EXTRUSION APPARATUS

Joseph A. Gialanella, Newark, N. J., assignor to Celanese Corporation of America, a corporation of Delaware Application November 27, 1948, Serial No. 62,287

1 Claim. (Cl. 18—12)

This invention relates to a novel apparatus for producing extruded articles, and relates more particularly to an apparatus for extruding thermoplastic materials to finished dimensions.

In the production of articles by the extrusion process, a heated thermoplastic material is forced under pressure through an extrusion nozzle having a shaping aperture. As the material emerges from the aperture it expands up to 10%, or more, so that the dimensions of the extruded article differ materially from those of the aperture. In articles having a non-symmetrical cross-section this expansion is non-uniform with the result that the article differs from the aperture in shape as well as in dimensions. Moreover, the expansion of the thermoplastic material as it leaves the shaping aperture usually varies in an irregular manner so as to cause surface imperfections on the extruded articles making it impossible to compensate for such expansion by varying the shape of the aperture when a highly finished and/or a closely dimensioned article is being produced. It has, therefore, been necessary heretofore to finish the extruded articles by grinding or polishing, when high surface finishes and/or accurate dimensions are desired. The finishing operation greatly increases the cost of the extruded articles, reducing their field of use.

It is an important object of this invention to overcome the foregoing and other disadvantages of the prior art apparatus for producing extruded articles.

A further object of this invention is to provide an apparatus for extruding thermoplastic materials to finished dimensions.

Another object of this invention is the provision of an apparatus for extruding thermoplastic materials in which the extruded article is passed through a sizing tube after it leaves the extrusion nozzle.

A still further object of this invention is to provide an apparatus for extruding thermoplastic materials in which the extruded article is passed through a lubricated sizing tube after it leaves the extrusion nozzle.

Other objects of this invention, together with certain details of construction and combinations of parts, will be apparent from the following detailed description and claim.

I have now discovered that the expansion which normally occurs in thermoplastic materials after they are forced through the shaping aperture of an extrusion nozzle may be eliminated by passing the extruded article through a sizing tube of the internal shape and dimensions desired in the finished article. The interior of the sizing tube is preferably lubricated both to improve the finish of the extruded article and to reduce the frictional forces which must be overcome in drawing said article therethrough. The passage of the extruded article through the sizing tube gives it a high surface finish and holds its dimensions within close limits, permitting said article to be used directly without grinding, polishing or other finishing treatments, or with the very minimum of such treatments.

While the sizing tube may be constructed of any desired material, it is preferably constructed of a porous material which may be impregnated with a lubricant and/or have a lubricant forced therethrough. Suitable porous materials for this purpose are sintered metals known as "Oilite," and ceramics such as unglazed porcelain. The sizing tube of porous material may be impregnated with a lubricant such as oil and will absorb a sufficient quantity thereof to permit a considerable length of extruded material to be passed therethrough before a further addition of lubricant is necessary. For continuous operation, a periodic, or preferably a continuous, supply of lubricant to the sizing tube must be provided. This may be accomplished readily by enclosing the sizing tube within a suitable chamber having a quantity of lubricant therein, and applying a sufficient pressure ranging from a few pounds per square inch upwardly, to the lubricant to force it through the porous walls of the sizing tube to the bore thereof. The lubricant may be pumped into the chamber at the desired pressure, or a hydrostatic pressure may be applied to the lubricant in the chamber by means of a fluid immiscible therewith. For example, when oil is employed as a lubricant, air, water or even steam may furnish the necessary hydrostatic pressure to force the oil through the sizing tube. Steam, in addition to providing the necessary hydrostatic pressure, also heats the lubricant, reducing its viscosity and thereby increasing its rate of flow through the porous material of the sizing tube. In addition to oil, other liquids to which the thermoplastic material is inert, such as water, for example, may be employed as lubricants.

During its passage through the sizing tube, at least the surface layers of the extruded articles are cooled and hardened sufficiently to prevent any further expansion of the thermoplastic material. To obtain the necessary cooling effect, the sizing tube should be at least about 6 inches in length and may range up to about 15 inches in length, although greater lengths are not objectionable since they do not affect either the finish or the dimensions of the extruded article unfavorably. The efficiency of cooling may be increased by cooling the lubricant which is applied to the thermoplastic material.

It may be desirable in certain cases, to employ a non-porous sizing tube. In this event, the sizing tube is spaced from the extrusion nozzle and the lubricant is applied to the extruded article as it traverses this space prior to its entry into the sizing tube. However, care must be taken to limit this space to prevent the extruded article from cooling and setting sufficiently to prevent effective operation of the sizing tube. After passing through the sizing tube, the extruded article may be deposited onto a moving belt or it may be drawn from the vicinity of the sizing tube in any other desired manner.

The shaping aperture of the extrusion nozzle through which the thermoplastic material is extruded may have dimensions identical with or very slightly less than those of the sizing tube. When the shaping aperture is smaller than the sizing tube, the difference in dimensions should at all times be less than the minimum expansion which occurs in the thermoplastic material. Otherwise, the sizing tube will not function effectively to control the size and finish of the extruded article.

The process and apparatus of the present invention may be employed in the extrusion of various thermoplastic materials such as cellulose esters including cellulose acetate, cellulose propionate, cellulose acetate-propionate, and cellulose acetate-butyrate, cellulose ethers including ethyl cellulose, and various miscellaneous materials including polyvinyl chloride, polyvinylidene chloride, polystyrene and polymerized acrylic compounds including polymerized methyl methacrylate. The thermoplastic materials may be compounded with plasticizers, fire retardants, ultra-violet absorbing materials and fillers. In addition, they may contain pigments, nacreous materials, dyes and similar substances to produce a decorative effect. There is no limitation on the shapes of the extruded articles, which may be solid or hollow and may have a symmetrical or a non-symmetrical cross-section.

A preferred embodiment of the apparatus of this invention is illustrated in the accompanying drawing in which the figure represents a view, partly in cross-section, of a sizing tube shown positioned on the extrusion nozzle of a press.

Referring now to the drawing, the reference numeral 11 designates an extrusion nozzle having a shaping aperture 12 through which a thermoplastic material is forced under pressure. At its free end, the extrusion nozzle 11 is provided with a threaded section 13 by means of which a chamber, indicated generally by the reference numeral 14, is fastened to said nozzle. The chamber 14 comprises a cylindrical casing 16 having end walls 17 and 18 welded or otherwise attached thereto. The end wall 17 has an internally threaded aperture 19 extending therethrough, which engages the threaded section 13 of the extrusion nozzle 11 forming a pressure tight seal therewith.

The interior of the chamber 14 is divided, by means of a partition 21, into two compartments 22 and 23 which may be sealed from each other or which may communicate with each other through apertures (not shown) which may be provided in the partition 21. A sizing tube 24 having threaded ends 26 and 27 is mounted in the compartment 23 with the threaded ends engaging internally threaded apertures 28 and 29 in the partition 21 and the end wall 18, respectively, to form liquid tight seals therewith. The sizing tube 24 has a passageway 31 extending therethrough, which passageway may, as indicated above, have dimensions equal to or very slightly larger than the dimensions of the shaping aperture 12. The passageway 31 may be provided with a curved entrance orifice 32 and a curved exit orifice 33 to guide the extruded article into and out of said passageway, thereby reducing the accuracy with which the sizing tube must be positioned with respect to the extrusion nozzle.

A pipe 34 extending through the casing 16 permits a lubricant to be introduced into the compartment 23 and a similar pipe 36 permits the application of hydrostatic pressure to said lubricant to force it through the walls of the sizing tube 24. A valve 37 permits the lubricant to be drained from the compartment 23 if desired. The compartment 22 is also provided with an inlet pipe 38 and a drain valve 39 to permit the introduction of a lubricant into said compartment when said compartment is sealed from compartment 23.

During operation, a quantity of lubricant is introduced into compartments 22 and 23, and a pressure of, for example, between about 30 and 50 pounds per square inch is applied to said lubricant in compartment 23 to force it through the walls of the sizing tube 24. The thermoplastic material after being forced through the shaping aperture 12 of the extrusion nozzle 11 passes through the passageway 31 of the sizing tube 24. A thin film of lubricant is applied to the extruded article during its passage through the sizing tube 24, and at least its surface layers are cooled and hardened. Upon leaving the sizing tube 24, the extruded article has a high surface finish and accurate dimensions. To increase the quantity of lubricant applied to the extruded article, the sizing tube 24 may be spaced a small distance from the end of the extrusion nozzle 11. During its passage across this space, the extruded article passes through the lubricant in compartment 22 and carries said lubricant with it through the sizing tube 24.

It is to be understood that the foregoing detailed description is given merely by way of illustration and that many variations may be made therein without departing from the spirit of my invention.

Having described my invention, what I desire to secure by Letters Patent is:

In an apparatus for the production of extruded articles of improved finish and dimensional accuracy, the combination with an extrusion nozzle for shaping a heat-softened thermoplastic material, of a porous sizing tube positioned adjacent to and spaced from said extrusion nozzle for receiving the extruded thermoplastic material after it leaves said extrusion nozzle, said sizing tube having a length of between 6 and 15 inches and the cross-sectional dimension of the shaping aperture in said extrusion nozzle being no greater than the cross-sectional dimensions of the passageway in said sizing tube and the difference between the cross-sectional dimensions in said shaping aperture and the cross-sectional dimensions of said passageway being less than the minimum expansion which occurs as a result of the change in the temperature of the thermoplastic material as it emerges from said extrusion nozzle, a casing defining a chamber encircling said sizing tube and the output end of the extrusion nozzle, a partition in said casing dividing said chamber into two compartments, means for introducing a lubricant into the compartment through which the extruded thermoplastic material first passes as it emerges from the extrusion nozzle whereby the extruded thermoplastic material will pick up lubricant on its surface as it traverses the space between the extrusion nozzle and the sizing tube and will carry lubricant with it into the sizing tube, means for introducing lubricant into the second compartment to provide a body of lubricant around the exterior of the sizing tube, and pressure means operatively connected to said second compartment to cause the lubricant to flow through the porous sizing tube.

JOSEPH A. GIALANELLA.

REFERENCES CITED

The following references are of record in the file of this patent:

UNITED STATES PATENTS

| Number | Name | Date |
|---|---|---|
| 1,607,623 | Higgins | Nov. 23, 1926 |
| 2,047,554 | Fischer | July 14, 1936 |
| 2,307,034 | Gaenzle | Jan. 5, 1943 |
| 2,365,374 | Bailey | Dec. 19, 1944 |
| 2,417,165 | Jacobson | Mar. 11, 1947 |
| 2,512,844 | Weber | June 27, 1950 |
| 2,519,375 | Jargstorff et al. | Aug. 22, 1950 |